US012763314B2

(12) United States Patent
Cheng et al.

(10) Patent No.: US 12,763,314 B2
(45) Date of Patent: Oct. 13, 2026

(54) NEGATIVE PRESSURE FORMATION METHOD FOR LITHIUM IRON MANGANESE PHOSPHATE BATTERIES AND BATTERIES APPLYING THE SAME

(71) Applicant: EVE POWER CO., LTD., Jingmen (CN)

(72) Inventors: Hao Cheng, Jingmen (CN); Xiaohan Deng, Jingmen (CN); Xiaokun Wang, Jingmen (CN); Haitao Wei, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 539 days.

(21) Appl. No.: 18/380,700

(22) Filed: Oct. 17, 2023

(65) Prior Publication Data

US 2024/0047643 A1 Feb. 8, 2024

(30) Foreign Application Priority Data

May 31, 2023 (CN) ......................... 202310649971.8

(51) Int. Cl.

| | |
|---|---|
| ***H01M 4/04*** | (2006.01) |
| ***H01M 4/02*** | (2006.01) |
| ***H01M 4/58*** | (2010.01) |
| ***H01M 10/0525*** | (2010.01) |
| ***H01M 10/0567*** | (2010.01) |
| ***H01M 10/058*** | (2010.01) |

(52) U.S. Cl.

CPC ....... *H01M 4/0447* (2013.01); *H01M 4/0471* (2013.01); *H01M 4/5825* (2013.01); *H01M 10/0525* (2013.01); *H01M 10/0567* (2013.01); *H01M 10/058* (2013.01); *H01M 2004/028* (2013.01)

(58) Field of Classification Search

None

See application file for complete search history.

(56) References Cited

U.S. PATENT DOCUMENTS

| | | | | |
|---|---|---|---|---|
| 2015/0060290 | A1* | 3/2015 | Xu | H01M 10/44 205/82 |
| 2015/0380777 | A1 | 12/2015 | Takahashi et al. | |

FOREIGN PATENT DOCUMENTS

| | | | | |
|---|---|---|---|---|
| CN | 105870508 | A * | 8/2016 | H01M 10/058 |
| CN | 107768723 | A | 3/2018 | |
| CN | 111883866 | A | 11/2020 | |
| CN | 113725508 | A | 11/2021 | |
| CN | 115966790 | A | 4/2023 | |

OTHER PUBLICATIONS

Machine Translation of CN-105870508-A (Year: 2016).*

WIPO, International Search Report and Written Opinion for International Application No. PCT/CN2023/101024, Jan. 31, 2024.

* cited by examiner

*Primary Examiner* — Gregg Cantelmo

(57) ABSTRACT

Provided in the present application is a negative pressure formation method for lithium iron manganese phosphate batteries and batteries applying the same. The method includes following steps: performing a vacuumizing process, a resting process and a charging process for a semi-finished battery cell to obtain a post-formation battery cell; the charging process is a three-stage constant-current charging process, wherein in the three-stage constant-current charging process, a charging current I, and a state of charge S are required to satisfy following relations: in a first stage constant-current charging process, $I_1 \leq 0.1$ C, state of charge: $5\% \leq S_1 \leq 15\%$; in a second stage constant-current charging process, 0.05 C$\leq I_2 \leq$0.15 C, state of charge: $15\% \leq S_2 \leq 25\%$; and in a third stage constant-current charging process, 0.15 C$\leq I_3 \leq$0.25 C, state of charge: $35\% \leq S_3 \leq 45\%$.

18 Claims, 1 Drawing Sheet

NEGATIVE PRESSURE FORMATION METHOD FOR LITHIUM IRON MANGANESE PHOSPHATE BATTERIES AND BATTERIES APPLYING THE SAME

CROSS-REFERENCE TO RELATED APPLICATIONS

The present application claims priority of Chinese Patent Application No.202310649971.8 filed on May 31, 2023 before CNIPA. All the above are hereby incorporated by reference in their entirety.

FIELD

The present application relates to the field of lithium battery manufacturing, in particular to a negative pressure formation method for lithium iron manganese phosphate batteries and batteries applying the same.

BACKGROUND

With the energy density of lithium iron phosphate gradually approaching the limit of the system, lithium iron manganese phosphate with its higher voltage platform (3.6V) is gradually gaining the attention of major manufacturers. The high voltage platform improves the energy density of the corresponding battery, and the energy density of the lithium iron manganese phosphate system battery is 15% higher than that of the lithium iron phosphate system battery in the equivalent case, which basically reaches the level of NCM523. Meanwhile, the safety performance of lithium iron manganese phosphate system batteries is much better than that of ternary system batteries, so more and more research on lithium iron manganese phosphate batteries has been conducted.

In the preparation process of the battery cell, the formation process in the post-process is a particularly important step. Formation is the process of charging the cell for the first time and the first time the battery forms an SEI film at the negative interface. The structure of SEI affects directly the direct current internal resistance (DCIR), cycling performance, and storage performance of the battery cell, while the most popular applications of lithium manganese iron phosphate battery cells are in the field of commercial vehicles and energy storage, which requires extremely high requirements for cycling and storage.

However, the current research on the formation process of lithium iron manganese phosphate batteries is quite limited. Since lithium iron manganese phosphate and lithium iron phosphate belong to the same phosphate system, the formation of the lithium iron phosphate system is directly adopted by the majority of manufacturers with a simple change in the formation solution. Since lithium iron manganese phosphate shows higher platform voltage and double platform voltage, the formation process of the lithium iron phosphate system is not fully applicable to the lithium iron manganese phosphate system; also due to the specificity of the system, the formation of lithium iron manganese phosphate battery cell may produce more gas and the interface is prone to have brown spot problem during the capacity grading.

SUMMARY

As a first aspect, provided in an embodiment of the present application is a negative pressure formation method for lithium iron manganese phosphate batteries, the method includes following steps: performing a vacuumizing process, a resting process and a charging process for a semi-finished battery cell to obtain a post-formation battery cell; the charging process is a three-stage constant-current charging process, in which in the three-stage constant-current charging process, a charging current I, and a state of charge S are required to satisfy following relations: in a first stage constant-current charging process, $I_1 \leq 0.1$ C, state of charge: $5\% \leq S_1 \leq 15\%$; in a second stage constant-current charging process, 0.05 $C \leq I_2 \leq 0.15$ C, state of charge: $15\% \leq S_2 \leq 25\%$; and in a third stage constant-current charging process, 0.15 $C \leq I_3 \leq 0.25$ C, state of charge: $35\% \leq S_3 \leq 45\%$. By adopting the negative pressure formation method provided in the present application, the gas generated during the formation of semi-finished batteries may be discharged under negative pressure (vacuumizing process) promptly. In addition, by controlling the state of charge (SOC) and charging current of semi-finished battery cells during the formation process, the problem that occurs in lithium iron manganese phosphate batteries, such as brown spots, may be improved.

As a second aspect, provided in an embodiment of the present application is a lithium iron manganese phosphate battery, in which a cathode active coating layer of the lithium iron manganese phosphate battery includes lithium iron manganese phosphate material, and the lithium iron manganese phosphate battery is subjected to negative pressure formation by any one of the methods mentioned above.

DETAILED DESCRIPTION OF THE PREFERRED EXAMPLES

Figure 1:
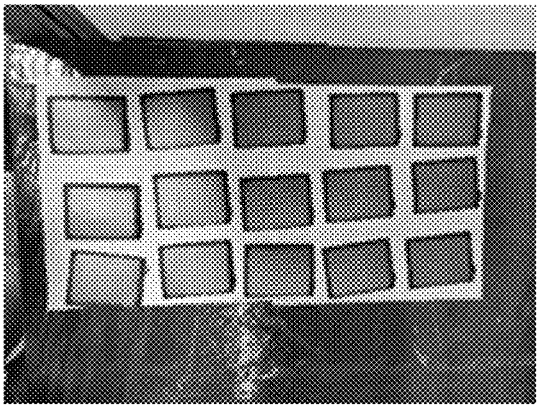
FIG. 1 is a lithium iron manganese phosphate battery cell prepared by the negative pressure formation method provided in Processing Group 1A of Example 1.

In one implementation, the charging current $I_1 < I_2 < I_3$ in the three-stage constant-current charging process. During the three-stage constant charging process, the charging current is gradually increased, which is conducive to adjusting a balance of stability and density in an SEI film. On the one hand, when the formation current is relatively large, the outer circuit electrons are transferred fast. In order to balance the electrochemical reaction, the lithium ions inside the battery diffuse fast, and the SEI film is formed faster, but at the same time, the SEI film formed during the formation is poor in stability. On the other hand, when the formation current is too low, the lithium-ion diffusion inside the battery is slower, and the SEI film is formed with more stability, but the ion permeability of the SEI film is reduced. Therefore, increasing or decreasing the charging current provides both advantages and disadvantages to the formation method. When charging semi-finished batteries by stepwise increasing constant-current charging, it is conducive to adjusting a balance of stability and density in an SEI film.

In one implementation, the vacuumizing process is to vacuumize the semi-finished battery cell to a vacuum degree of −90 to −80 Kpa.

In one implementation, an electrolyte of the semi-finished battery cell includes solutes, solvents and additives; and the additives include vinylidene carbonate (VC).

In one implementation, the additives of the electrolyte of the semi-finished battery cell also include fluorinated ethylene carbonate (FEC).

In one implementation, the solutes of the electrolyte of the semi-finished battery cell also include lithium hexafluorophosphate ($LiPF_6$).

In one implementation, the solvents of the electrolyte of the semi-finished battery cell include at least one of ethylene carbonate (EC), dimethyl carbonate (DMC), ethyl methyl carbonate (EMC), diethyl carbonate (DEC), dimethyl ether (DME) and propylene carbonate (PC).

In one implementation, a liquid injection coefficient of the semi-finished battery cell is 3.0 to 4.0, in which the liquid injection coefficient is the ratio of the electrolyte injection volume to the rated capacity.

In one implementation, the negative pressure formation method for lithium iron manganese phosphate batteries includes following steps: in step 1: vacuumizing the semi-finished battery cell to a vacuum degree of −90 to −80 Kpa at a formation temperature of 35 to 55° C., resting for 3 to 10 min, followed by the first stage constant-current charging, the charging current $I_1 \leq 0.1$ C, and stopping the charging when the state of charge $S_1$ reaches 5 to 15%; in step 2: performing the second stage constant-current charging, in which the charging current $I_2$ is 0.05 to 0.15 C, and stopping the charging when the state of charge $S_2$ reaches 15 to 25%; and in step 3: performing the third stage constant-current charging, in which the charging current $I_3$ is 0.05 to 0.15 C, and stopping the charging when the state of charge $S_3$ reaches 35 to 45% so as to obtain a post-formation battery cell.

In one implementation, a constant vacuum degree in step 1, step 2 and step 3 is maintained.

In one implementation, the semi-finished battery cell is also required to be rested for 3 to 10 min after each stopping of charging in step 1, step 2 and step 3. After each time the charging is stopped, resting the battery cell enables the electrolyte to be fully infiltrated with the interior of the battery to ensure the internal stability of the battery, so that the internal electrochemical reaction of the battery reaches equilibrium, which also improves the accuracy of monitoring in the formation process.

In one implementation, the semi-finished battery cell is a prismatic cell or a pouch cell.

In one implementation, a coating surface density of the cathode active coating layer of the lithium iron manganese phosphate battery is 200 to 250 g/m$^2$.

In one implementation, an anode active coating layer of the lithium iron manganese phosphate battery includes at least one of graphite and silicon-carbon composites.

In one implementation, a coating surface density of an anode active coating layer of the lithium iron manganese phosphate battery is 100 to 125 g/m$^2$.

EXAMPLE 1

Processing Groups 1A

1. Preparation of a Semi-Finished Battery Cell
   - Step 1: the anode material graphite, the conductive agent acetylene black, the binder carboxymethylcellulos (CMC), and styrene butadiene rubber (SBR) are prepared into a slurry coated on the copper foil collector according to the mass ratio of 94:1:2:3, and then vacuum-dried to prepare the negative electrode sheet;
   - Step 2: the cathode material $LiMn_{0.6}Fe_{0.4}PO4$, the conductive agent acetylene black, and the binder polyvinylidene fluoride (PVDF) are prepared into a slurry coated on an aluminum foil collector according to a mass ratio of 94:3:3, and then vacuum dried to prepare a positive electrode sheet;
   - Step 3: configuration of electrolyte: the electrolyte is a mixture of EC, DMC, and EMC with 1 mol/L $LiPF_6$ dissolved, according to a mass ratio of EC:DMC:EMC=1:1:1; in addition, a mass fraction of 0.5% VC and 1% FEC are also contained in the electrolyte;
   - Step 4: a semi-finished pouch cell is assembled with a positive electrode sheet, a negative electrode sheet, a Celgard 2400 separator, and an electrolyte respectively.
2. Formation of the Prepared Pouch Cell
   - Step 1: vacuumizing the semi-finished pouch cell to −85 Kpa at a formation temperature of 45° C. and maintaining a constant vacuum degree and temperature during a subsequent formation process, resting for 5 min, followed by the first stage constant-current charging, the charging current $I_1$ is 0.05 C, and stopping the charging when the state of charge $S_1$ reaches 10%, and resting for 5 min;
   - Step 2: performing the second stage constant-current charging, in which the charging current $I_2$ is 0.1 C, and stopping the charging when the state of charge $S_2$ reaches 20%, and resting for 5 min; and
   - Step 3: performing the third stage constant-current charging, in which the charging current $I_3$ is 0.2 C, and stopping the charging when the state of charge $S_3$ reaches 40%, and resting for 5 min so as to obtain a post-formation battery cell.

The current of the three-stage constant-current charging in the negative pressure formation method for lithium iron manganese phosphate batteries is used as a variable in Processing Groups 1A to 4A and Contrast Groups 1A to 3A of Example 1, and the variables in Processing Groups 1A to 4A and Contrast Groups 1A to 3A are shown in Table 1. Except for the above differences, the operating steps for the preparation of semi-finished pouch cells and the negative pressure formation method of Processing Groups 1A to 4A and Contrast Groups 1A to 3A of Example 1 are kept strictly the same.

TABLE 1

Variables of formation for battery cells in Processing Groups 1A to 4A and Contrast Group 1A to 3A

| Groups | $I_1$ | $I_2$ | $I_3$ |
|---|---|---|---|
| Processing Group 1A | 0.05C | 0.1C | 0.2C |
| Processing Group 2A | 0.01C | 0.05C | 0.15C |
| Processing Group 3A | 0.1C | 0.15C | 0.25C |
| Processing Group 4A | 0.1C | 0.05C | 0.15C |
| Contrast Group 1A | 0.02C | 0.05C | 0.1C |
| Contrast Group 2A | 0.15C | 0.2C | 0.3C |

Testing Example 1

1. Testing Object

The post-formation battery cells of each Processing Group and each Contrast Group in Example 1.

2. Testing Method (1) Hybrid Pulse Power Characteristic (HPPC) test: The direct current internal resistance (DCIR) of the battery cell is calculated by applying a 2 C discharging current for 10 seconds at 25° C. to the post-formation battery cell, resting for 40 seconds, and applying a 1 C charging current for 10 seconds to the battery cell.

(2) Cycling Test: Charging the lithium-ion battery at 25° C. with 1 C constant current to a voltage of 4.2V, and then charging it with 4.2V constant voltage to a current of 0.05 C, and the above is one charge/discharge cycle. The battery cells are subjected to 1000 charge/discharge cycles at 25° C. under the above conditions respectively, in which the capacity retention rate is calculated according to formula 1.

$$\text{Capacity Maintain Rate}(\%) = \frac{\text{Discharge capacity at the } N^{th} \text{ cycle}}{\text{initial discharge capacity}} \times 100\% \quad \text{(formula 1)}$$

Storage Stability Test: Lithium-ion batteries are charged at 1 C constant current to a voltage of 4.2V at room temperature, and then charged at 4.2V constant-voltage to a current of 0.05 C to measure an initial capacity retention rate of the battery cell, and then stored in a constant temperature box at 55° C. for 30 days, after which the final capacity retention rate of the battery cell is tested, in which the capacity recovery rate is calculated according to formula 2.

$$\text{Storage Capacity Restoration Rate}(\%) = \frac{\text{final capacity} - \text{initial capacity}}{\text{initial capacity}} \times 100\% \quad \text{(formula 2)}$$

(4) The state of battery cells: The normal standard for determining the battery cells is that there is no obvious black spot on the surface of the electrode sheet, and the color of the interface is uniform.

(5) Liquid Loss Rate: Adopting an electronic weighing method to test the liquid loss rate of the electrolyte (i.e., the mass ratio of lost electrolyte to the injected electrolyte) by measuring the difference between the weight of the battery cell before the formation and the weight of the battery cell after the formation.

(6) Formation time: A timer is used to determine the formation time.

3. Testing Results and Analysis

The testing results of the present testing example are shown in Table 2, in which the testing example focuses on exploring the impact of the change in current on the battery cell in the three-stage constant-current charging during the formation. Firstly, in Contrast Group 1A, since the three stages of formation current are all too small, a relatively thick SEI film is thus formed by the method provided in Contrast Group 1A, resulting in a longer formation time and a significant reduction in productivity, which also results that the lithium-ion diffusion rate inside the battery is relatively slow, and the ion permeability of the SEI film is reduced, resulting in an increase in the internal resistance of the charge polarization of the battery cell and a decrease in capacity recovery rate. In Contrast Group 2A, the formation current is too high. Although the formation time is relatively short, due to the fast electron transfer rate of the external circuit, in order to balance the electrochemical reaction, the lithium-ion diffusion rate inside the battery is fast, and the stability of the SEI film formed during formation is poor, which leads to the peeling off of the SEI film of the battery cell that has been recycled for a long time, so that a new SEI film is formed continuously, which leads to an increase in the irreversible loss of the capacity of the battery cell, and acceleration of the capacity decay of the battery cell, which results in poor capacity retention rate and poor capacity recovery rate of the post-formation battery cell.

Secondly, the Processing Groups 1A to 3A is gradually increasing the charging current during the three-stage constant-current charging process. Moreover, as the current increases in the same stage, the electrical performance of the corresponding post-formation battery cell shows a tendency of first increasing and then decreasing. When the formation current is increased or decreased, it affects the formation of the SEI film. Thus, it may be confirmed by the present testing example that the formation current affects the balance of stability and density of the SEI film of the battery cell. Among the Processing Groups 1A to 3A, the electrical performance of the post-formation battery cell corresponding to Processing Group 1A is the best, as shown in FIG. 1. Since the charging current thereof during the first stage of constant current charging in Processing Group 2A is relatively small, the formation time thereof is relatively long, the SEI film formed thereon is relatively thick, resulting in a relatively large DCIR. Compared to Contrast Group 1A, both groups are charged with a small current, whereas Processing Group 2A is charged with a much smaller I1, resulting in a longer formation time in Processing Group 2A than that in Contrast Group 1A. In Processing Group 4A, however, the progressive increase of charging current is not used for the formation of battery cells. From the testing results, it is observed that the electrochemical performance of the battery cells corresponding to the formation of Processing Group 4A is decreased in comparison with the battery cells of Processing Group 1A.

TABLE 2

Testing Results of the present Testing Example

| Groups | R/mΩ | Capacity Retention Rate | Capacity Recovery Rate | Status of the electrode sheet | Fluid Loss Rate | Formation Time |
|---|---|---|---|---|---|---|
| Processing Group 1A | 1.13 | 92.5% | 97.9% | No brown spots on the interface | 0.4% | 240 min |
| Processing Group 2A | 1.71 | 92.1% | 96.3% | No brown spots on the interface | 0.5% | 800 min |
| Processing Group 3A | 1.10 | 91.4% | 96.5% | No brown spots on the interface | 0.6% | 148 min |
| Processing Group 4A | 1.12 | 91.5% | 96.2% | No brown spots on the interface | 0.5% | 260 min |
| Contrast Group 1A | 1.68 | 92.4% | 97.1% | No brown spots on the interface | 0.5% | 370 min |
| Contrast Group 2A | 1.08 | 91.1% | 94.2% | Brown spots on the interface | 0.6% | 110 min |

EXAMPLE 2

The present example sets up the Processing Group 1B according to the Processing Group 1A of Example 1. Additionally, the state of charge of the three-stage constant-current charging in the negative pressure formation method for lithium iron manganese phosphate batteries is used as a variable in Processing Groups 1B to 3B and Contrast Groups 1B to 2B of Example 2, and the variables in Processing Groups 1B to 3B and Contrast Groups 1B to 2B are shown in Table 3. Semi-finished pouch cells are prepared by Processing Groups 1B to 3B and Contrast Groups 1B to 2B of Example 2 by referring to Processing Group 1A of Example 1, and operating steps of the negative-pressure formation method are kept strictly the same.

TABLE 3

Variables of formation for battery cells in Processing Groups 1B to 3B and Contrast Groups 1B to 2B

| Groups | $S_1$ | $S_2$ | $S_3$ |
|---|---|---|---|
| Processing Group 1B | 10% | 20% | 40% |
| Processing Group 2B | 5% | 15% | 35% |
| Processing Group 3B | 15% | 25% | 45% |
| Contrast Group 1B | 3% | 10% | 30% |
| Contrast Group 2B | 20% | 40% | 60% |

Testing Example 2

1. Testing Object

The post-formation battery cells of each Processing Group and each Contrast Group in Example 2.

2. Testing Method

Refer to the testing method in Testing Example 1.

3. Testing Results and Analysis

The testing results of the present testing example are shown in Table 4, in which the testing example focuses on exploring the impact of the change of SOC on the battery cell in the three-stage constant-current charging during the formation. The setting of SOC, with respect to lithium iron manganese phosphate batteries, not only affects the formation time of the battery cell, but also affects whether brown spots may occur on the battery cell. In processing groups 1B to 3B, DCIR gradually increases due to the extension of the small-current formation time; as the SOC state increases in the same step, the electrical performance of the corresponding post-formation battery cell shows a tendency of first increasing and then decreasing.

Compared to Processing Group 2B, in Contrast Group 1B, when the SOC of each stage of constant-current charging in the three-stage constant-current charging is too low, due to the low SOC of the first small-current formation, the SEI film is not sufficiently formed, resulting in a less stable SEI film and a relatively low capacity retention rate. Compared to Processing Group 3B, in Contrast Group 2B, when the SOC of each stage of constant-current charging in the three-stage constant-current charging is too high, the surface of the battery cell shows black spots, resulting poor electrical performance.

TABLE 4

Testing Results of the present Testing Example

| Groups | R/mΩ | Capacity Retention Rate | Capacity Recovery Rate | Status of the electrode sheet | Fluid Loss Rate | Formation Time |
|---|---|---|---|---|---|---|
| Processing Group 1B | 1.13 | 92.5% | 97.9% | No brown spots on the interface | 0.4% | 240 min |
| Processing Group 2B | 1.12 | 92.2% | 97.2% | No brown spots on the interface | 0.4% | 195 min |
| Processing Group 3B | 1.16 | 91.6% | 96.3% | No brown spots on the interface | 0.5% | 300 min |
| Contrast Group 1B | 1.14 | 92.0% | 96.9% | No brown spots on the interface | 0.4% | 138 min |
| Contrast Group 2B | 1.15 | 91.3% | 96.1% | Brown spots on the interface | 0.6% | 420 min |

EXAMPLE 3

The present example sets up the Processing Group 1C according to the Processing Group 1A of Example 1. Additionally, the vacuum degree of the three-stage constant-current charging in the negative pressure formation method for lithium iron manganese phosphate batteries is used as a variable in Processing Groups 1C to 5C and Contrast Groups 1C of Example 3, and the variables in Processing Groups 1C to 5C and Contrast Groups 1C are shown in Table 5. Semi-finished pouch cells are prepared by Processing Groups 1C to 5C and Contrast Groups 1C of Example 3 by referring to Processing Group 1A of Example 1, and operating steps of the negative-pressure formation method are kept strictly the same.

TABLE 5

Variables of formation for battery cells in Processing Groups 1C to 5C and Contrast Group 1C

| Groups | Vacuum Degree / Kpa |
|---|---|
| Processing Group 1C | −85 |
| Processing Group 2C | −70 |
| Processing Group 3C | −80 |
| Processing Group 4C | −90 |
| Processing Group 5C | −100 |
| Contrast Group 1C | 0 |

Testing Example 3

1. Testing object

The post-formation battery cells of each Processing Group and each Contrast Group in Example 2.

2. Testing Method

Refer to the testing method in Testing Example 1.

3. Testing Results and Analysis

The testing results of the present testing example are shown in Table 6, in which the present testing example focuses on exploring the influence of the change in vacuum degree on the battery cell in the three-stage constant-current charging during the formation. As shown in Contrast Group 1C, the lithium iron manganese phosphate battery cell is subjected to formation under normal pressure, and the corresponding post-formation battery cell shows serious swelling, which may greatly affect the storage stability and electrochemical performance of the battery cell. In Processing Groups 1C to 5C, however, it is to explore the impact of different negative pressure conditions on the performance of the post-formation battery cells. As the vacuum degree decreases, the electrochemical performance and storage stability of the post-formation battery cell corresponding to the Processing Groups 1C to 5C show a tendency of first increasing and then decreasing. As shown in the testing results, the lithium iron manganese phosphate battery cell obtained after formation provides better electrochemical performance and storage stability when the vacuum degree is −90 to −80 Kpa. The post-formation lithium iron manganese phosphate battery cell in Processing Group 1 C provides the best performance.

TABLE 6

Testing Results of the present Testing Example

| Groups | R/mΩ | Capacity Retention Rate | Capacity Recovery Rate | Status of the electrode sheet | Fluid Loss Rate | Formation Time |
|---|---|---|---|---|---|---|
| Processing Group 1C | 1.13 | 92.5% | 97.9% | No brown spots on the interface | 0.4% | 240 min |
| Processing Group 2C | 1.12 | 92.1% | 97.5% | Mild brown spots | 0.3% | 240 min |
| Processing Group 3C | 1.13 | 92.6% | 97.8% | No brown spots on the interface | 0.4% | 240 min |
| Processing Group 4C | 1.13 | 92.6% | 97.8% | No brown spots on the interface | 0.8% | 240 min |
| Processing Group 5C | 1.13 | 92.4% | 97.6% | No brown spots on the interface | 1.0% | 240 min |
| Contrast Group 1C | 1.56 | 91.5% | 95.3% | Severe brown spots on the interface | 0.1% | 240 min |

EXAMPLE 4

The present example sets up the Processing Group 1D according to the Processing Group 1A of Example 1. Additionally, the formation temperature in the negative pressure formation method for lithium iron manganese phosphate batteries is used as a variable in Processing Groups 1D to 5D of Example 4, and the variables in Processing Groups 1D to 5D are shown in Table 7. Semi-finished pouch cells are prepared by Processing Groups 1D to 5D of Example 4 by referring to Processing Group 1A of Example 1, and operating steps of the negative-pressure formation method are kept strictly the same.

TABLE 7

Variables of formation for battery cells in Processing Groups 1D to 5D

| Groups | Formation Temperature/° C. |
|---|---|
| Processing Group 1D | 45 |
| Processing Group 2D | 25 |
| Processing Group 3D | 35 |
| Processing Group 4D | 55 |
| Processing Group 5D | 65 |

Testing Example 4

1. Testing object

The post-formation battery cells of each Processing Group and each Contrast Group in Example 4.

2. Testing Method

Refer to the testing method in Testing Example 1.

3. Testing Results and Analysis

The testing results of the present testing example are shown in Table 8, in which the present testing example focuses on exploring the impact of the change in the formation temperature on the battery cell in the negative pressure formation method of the lithium iron manganese phosphate battery. As the formation temperature increases in Processing Group 1D to 5D, the electrochemical performance and storage stability of lithium iron manganese phosphate battery cells show a tendency of first increasing and then decreasing. As shown in the testing results, the lithium iron manganese phosphate battery cell obtained after formation provides better electrochemical performance and storage stability when the formation temperature is 35 to 55° C. The post-formation lithium iron manganese phosphate battery cell in Processing Group 1D provides the best performance.

TABLE 8

Testing Results of the present Testing Example

| Groups | R/mΩ | Capacity Retention Rate | Capacity Recovery Rate | Status of the electrode sheet | Fluid Loss Rate | Formation Time |
|---|---|---|---|---|---|---|
| Processing Group 1D | 1.13 | 92.5% | 97.9% | No brown spots on the interface | 0.4% | 240 min |
| Processing Group 2D | 1.33 | 91.2% | 95.6% | Brown spots on the interface | 0.4% | 240 min |
| Processing Group 3D | 1.22 | 91.6% | 96.3% | No brown spots on the interface | 0.4% | 240 min |
| Processing Group 4D | 1.15 | 92.4% | 98.1% | No brown spots on the interface | 0.4% | 240 min |
| Processing Group 5D | 1.18 | 92.4% | 97.6% | No brown spots on the interface | 0.4% | 240 min |

EXAMPLE 5

Processing Group 1E

The present example sets up Processing Group 1E according to the prepared semi-finished battery cell and the negative pressure formation method provided by Processing Group 1A of Example 1.

Processing Group 2E

The present processing group refers to the negative pressure formation method provided in Processing Group 1E of Example 5 for the formation of the prepared battery cells, and the present processing group differs from Processing Group 1E of Example 5 in that the present Processing Group performs a vacuumizing process only before the first stage constant-current charging. Except for the above differences, the operating steps of the present processing group for preparing a semi-finished pouch cell and the negative pressure formation method are strictly the same as those of Processing Group 1E of Example 5.

Processing Group 3E

The present processing group refers to the negative pressure formation method provided in Processing Group 1E of Example 5 for the formation of the prepared battery cells, and the present processing group differs from Processing Group 1E of Example 5 in that the present Processing Group is not subjected to a resting process after three stages of constant-current charging. Except for the above differences, the operating steps of the present processing group for preparing a semi-finished pouch cell and the negative pressure formation method are strictly the same as those of Processing Group 1E of Example 5.

Contrast Group 1E

The present processing group refers to the negative pressure formation method provided in Processing Group 1E of Example 5 for the formation of the prepared battery cells, and the present processing group differs from Processing Group 1E of Example 5 in that the battery cell of the present contrast group is charged at constant current with only one stage until the state of charge reaches 40%. Except for the above differences, the operating steps of the present processing group for preparing a semi-finished pouch cell and the negative pressure formation method are strictly the same as those of Processing Group 1E of Example 5. Specifically, steps of the formation method for pouch cells in the present contrast group are as follows:

Step 1: vacuumizing the semi-finished battery cell to −85 Kpa at a formation temperature of 45° C. and maintaining a constant vacuum degree and temperature during a subsequent formation process, resting for 5 min, followed by the first stage constant-current charging, the charging current I being 0.1 C, and stopping the charging when the state of charge S reaches 40%, and resting for 5 min so as to obtain a post-formation battery cell.

Contrast Group 2E

The present processing group refers to the negative pressure formation method provided in Processing Group 1E of Example 5 for the formation of the prepared battery cells, and the present processing group differs from Processing Group 1E of Example 5 in that the battery cell of the present contrast group is charged at constant current with four stages until the state of charge reaches 40%. Except for the above differences, the operating steps of the present processing group for preparing a semi-finished pouch cell and the negative pressure formation method are strictly the same as those of Processing Group 1E of Example 5. Specifically, steps of the formation method for pouch cells in the present contrast group are as follows:

Step 1 to Step 2 are strictly the same as that in Processing Group 1E of Example 5;

Step 3: Performing the third stage constant-current charging, in which the charging current $I_3$ is 0.2 C, and stopping the charging when the state of charge $S_3$ reaches 30%, and resting for 5 min; and Step 4: Performing the fourth stage constant-current charging, in which the charging current $I_4$ is 0.3 C, and stopping the charging when the state of charge $S_4$ reaches 40%, and resting for 5 min so as to obtain a post-formation battery cell.

Contrast Group 3E

The present processing group refers to the negative pressure formation method provided in Processing Group 1E of Example 5 for the formation of the prepared battery cells, and the present processing group differs from Processing Group 1E of Example 5 in that the battery cell of the present contrast group is charged at constant current with three stages and at constant voltage with one stage. Except for the above differences, the operating steps of the present processing group for preparing a semi-finished pouch cell and the negative pressure formation method are strictly the same as those of Processing Group 1E of Example 5. Specifically, steps of the formation method for pouch cells in the present contrast group are as follows:

Step 1 to Step 2 are strictly the same as that in Processing Group 1E of Example 5;

Step 3: Performing a third stage constant-current charging, in which the charging current $I_3$ is 0.2 C; when the voltage reaches 4.2V, constant-voltage charging to 0.05 C and stopping charging, and resting for 5 min; and the state of charge $S_3$ reaches 100%

Testing Example 5

1. Testing Object

The post-formation battery cells of each Processing Group and each Contrast Group in Example 5.

2. Testing Method

Refer to the testing method in Testing Example 1.

3. Testing Results and Analysis

Figure 2:
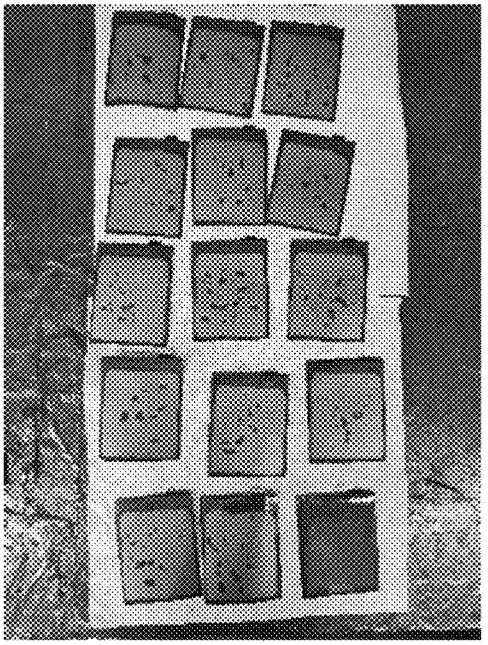
FIG. 2 is a lithium iron manganese phosphate battery cell prepared by the negative pressure formation method provided in Contrast Group 3E of Example 5.

The testing results of the present testing example are shown in Table 9, in which the present testing example focuses on exploring the impact of the negative pressure formation method of lithium iron phosphate batteries on the battery cells. In Contrast Group 1E, no segmented constant-current charging is used for the formation of the lithium iron manganese phosphate battery cell. From the testing results and observation of the state of the post-formation battery cell, it is evident that one-stage constant-current charging to a SOC of 40% of the battery cell leads to brown spots on the battery cell and lower stability of the formed SEI film, resulting in a significant decrease in electrochemical performance. In Contrast Group 2E, four-stage constant-current charging is used, which involves cumbersome steps and reduces productivity. In Contrast Group 3E, as shown in FIG. 2, in the last charging stage, constant current and constant voltage are used to charge the battery cell, resulting in brown spots on the surface of the battery cell and a deterioration in the electrochemical performance of the prepared lithium iron manganese phosphate battery cell.

Compared to Processing Group 1E, the storage stability of the lithium iron manganese phosphate battery cell prepared by the formation method provided in Processing Group 2E is decreased, which is likely due to the fact that the negative pressure is able to discharge the gas generated in the formation process promptly. Although Processing Group 2E also performs the formation with negative pressure, the storage stability of the battery cell is decreased due to the fact that the negative pressure is not maintained at a constant level. The electrochemical performance of lithium iron manganese phosphate battery cell prepared by the formation method provided in Processing Group 3E is deteriorated, which is likely due to the fact that it is not rested promptly after charging, resulting in a decrease in stability within the battery cell.

TABLE 9

Testing Results of the present Testing Example

| Groups | R/mΩ | Capacity Retention Rate | Capacity Recovery Rate | Status of the electrode sheet | Fluid Loss Rate | Formation Time |
|---|---|---|---|---|---|---|
| Processing Group 1E | 1.13 | 92.5% | 97.9% | No brown spots on the interface | 0.4% | 240 min |
| Processing Group 2E | 1.16 | 92.1% | 96.5% | No brown spots on the interface | 0.2% | 240 min |
| Processing Group 3E | 1.15 | 92.2% | 97.1% | No brown spots on the interface | 0.4% | 240 min |
| Contrast Group 1E | 1.16 | 90.2% | 95.2% | Brown spots on the interface | 0.4% | 240 min |
| Contrast Group 2E | 1.15 | 91.1% | 96.5% | No brown spots on the interface | 0.4% | 230 min |
| Contrast Group 3E | 1.17 | 91.5% | 96.7% | Brown spots on the interface | 0.4% | 380 min |

The invention claimed is:

1. A negative pressure formation method for lithium iron manganese phosphate batteries, the method comprising following steps: performing a vacuumizing process, a resting process and a charging process for a semi-finished battery cell to obtain a post-formation battery cell;

the charging process is a three-stage constant-current charging process, wherein in the three-stage constant-current charging process, a charging current I, and a state of charge S are required to satisfy following relations:

in a first stage constant-current charging process, $I_1 \leq 0.1$ C, state of charge: $5\% \leq S_1 \leq 15\%$;

in a second stage constant-current charging process, 0.05 $C \leq I_2 \leq 0.15$ C, state of charge: $15\% \leq S_2 \leq 25\%$; and in a third stage constant-current charging process, 0.15 $C \leq I_3 \leq 0.25$ C, state of charge: $35\% \leq S_3 \leq 45\%$.

2. The method according to claim 1, wherein the charging current $I_1 \leq I_2 \leq I_3$ in the three-stage constant-current charging process.

3. The method according to claim 1, wherein the vacuumizing process is to vacuumize the semi-finished battery cell to a vacuum degree of −90 to −80 Kpa.

4. The method according to claim 1, wherein an electrolyte of the semi-finished battery cell comprises solutes, solvents and additives; and the additives comprising vinylidene carbonate.

5. The method according to claim 4, wherein a liquid injection coefficient of the semi-finished battery cell is 3.0 to 4.0.

6. The method according to claim 1, the method comprising following steps:

step 1: vacuumizing the semi-finished battery cell to a vacuum degree of −90 to −80 Kpa at a formation temperature of 35 to 55° C., resting for 3 to 10 min, followed by the first stage constant-current charging, the charging current $I_1 \leq 0.1$ C, and stopping the charging when the state of charge $S_1$ reaches 5 to 15%;

step 2: performing the second stage constant-current charging, wherein the charging current $I_2$ is 0.05 to 0.15 C, and stopping the charging when the state of charge $S_2$ reaches 15 to 25%; and step 3: performing the third stage constant-current charging, wherein the charging current $I_3$ is 0.05 to 0.15 C, and stopping the charging when the state of charge $S_3$ reaches 35 to 45% so as to obtain a post-formation battery cell.

7. The method according to claim 6, wherein a constant vacuum degree in step 1, step 2 and step 3 is maintained.

8. The method according to claim 7, wherein the semi-finished battery cell is also required to be rested for 3 to 10 min after each stopping of charging in step 1, step 2 and step 3.

9. The method according to claim 6, wherein the semi-finished battery cell is a prismatic cell or a pouch cell.

10. A lithium iron manganese phosphate battery, wherein a cathode active coating layer of the lithium iron manganese phosphate battery comprises lithium iron manganese phosphate material, and the lithium iron manganese phosphate battery is subjected to a negative pressure formation method, the method comprising following steps: performing a vacuumizing process, a resting process and a charging process for a semi-finished battery cell to obtain a post-formation battery cell;

the charging process is a three-stage constant-current charging process, wherein in the three-stage constant-current charging process, a charging current I, and a state of charge S are required to satisfy following relations:

in a first stage constant-current charging process, $I_1 \leq 0.1$ C, state of charge: $5\% \leq S_1 \leq 15\%$;

in a second stage constant-current charging process, 0.05 $C \leq I_2 \leq 0.15$ C, state of charge: $15\% \leq S_2 \leq 25\%$; and in a third stage constant-current charging process, 0.15 $C \leq I_3 \leq 0.25$ C, state of charge: $35\% \leq S_3 \leq 45\%$.

11. The lithium iron manganese phosphate battery according to claim 10, wherein the charging current $I_1 \leq I_2 \leq I_3$ in the three-stage constant-current charging process.

12. The lithium iron manganese phosphate battery according to claim 10, wherein the vacuumizing process is to vacuum the semi-finished battery cell to a vacuum degree of −90 to −80 Kpa.

13. The lithium iron manganese phosphate battery according to claim 10, wherein an electrolyte of the semi-finished battery cell comprises solutes, solvents and additives; and the additives comprising vinylidene carbonate.

14. The lithium iron manganese phosphate battery according to claim 13, wherein a liquid injection coefficient of the semi-finished battery cell is 3.0 to 4.0.

15. The lithium iron manganese phosphate battery according to claim 10, the method comprising following steps:

step 1: vacuumizing the semi-finished battery cell to a vacuum degree of −90 to −80 Kpa at a formation temperature of 35 to 55° C., resting for 3 to 10 min, followed by the first stage constant-current charging, the charging current $I_1 \leq 0.1$ C, and stopping the charging when the state of charge $S_1$ reaches 5 to 15%;

step 2: performing the second stage constant-current charging, wherein the charging current $I_2$ is 0.05 to 0.15 C, and stopping the charging when the state of charge $S_2$ reaches 15 to 25%; and step 3: performing the third stage constant-current charging, wherein the charging current $I_3$ is 0.05 to 0.15 C, and stopping the charging when the state of charge $S_3$ reaches 35 to 45% so as to obtain a post-formation battery cell.

16. The lithium iron manganese phosphate battery according to claim 15, wherein a constant vacuum degree in step 1, step 2 and step 3 is maintained.

17. The lithium iron manganese phosphate battery according to claim 16, wherein the semi-finished battery cell is also required to be rested for 3 to 10 min after each stopping of charging in step 1, step 2 and step 3.

18. The lithium iron manganese phosphate battery according to claim 15, wherein the semi-finished battery cell is a prismatic cell or a pouch cell.

* * * * *